United States Patent
Lee et al.

(10) Patent No.: US 6,690,944 B1
(45) Date of Patent: Feb. 10, 2004

(54) POWER CONTROL OF A MULTI-SUBCHANNEL MOBILE STATION IN A MOBILE COMMUNICATION SYSTEM

(75) Inventors: Wookwon Lee, Ottawa (CA); Norman P. Secord, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/289,584

(22) Filed: Apr. 12, 1999

(51) Int. Cl.[7] .................................................. H04B 7/00
(52) U.S. Cl. ........................................ 455/522; 455/69
(58) Field of Search .......................... 455/522, 69, 70, 455/127, 132–137, 101–103, 422; 370/318, 337, 355

(56) References Cited

U.S. PATENT DOCUMENTS

| | | | |
|---|---|---|---|
| 5,216,692 A | * 6/1993 | Ling ............................ | 455/69 |
| 5,623,484 A | * 4/1997 | Muszynski .................. | 370/335 |
| 5,832,387 A | * 11/1998 | Bae et al. .................... | 455/522 |
| 5,930,230 A | * 7/1999 | Odenwalder et al. ........ | 370/208 |
| 5,987,333 A | * 11/1999 | Sole ............................ | 455/522 |
| 5,991,284 A | * 11/1999 | Willenegger et al. ........ | 370/335 |
| 5,991,285 A | * 11/1999 | Ghosh ........................ | 370/335 |
| 6,222,888 B1 | * 4/2001 | Kao et al. .................... | 375/260 |
| 6,240,071 B1 | * 5/2001 | Willenegger et al. ........ | 370/311 |
| 6,278,701 B1 | * 8/2001 | Ayyagari et al. ............. | 370/335 |
| 6,285,886 B1 | * 9/2001 | Kamel et al. ................. | 455/522 |

OTHER PUBLICATIONS

Wookwon et al., Performance of Closed–Loop Power Control for a Mu;lti–channel Mobile Station in the cdma2000 System, WCNC. 1999 IEEE, Sep. 21, 1999–Sep. 24, 1999, vol. 2, pp. 908–912.*

Roy D. Yates, "A Framework for Uplink Power Control in Cellular Radio Systems", IEEE Journal on Selected Areas in Communications. vol. 13, No. 7, Sep. 1995, pp. 1341–1347.

* cited by examiner

*Primary Examiner*—Charles Appiah

(57) ABSTRACT

A closed loop power control apparatus is implemented within a basestation that receives a series of physical channels from a mobile station simultaneously in a DS-CDMA communication system such as those based on the cdma2000 specifications. This power control apparatus includes a series of Rakes that separate the code-subchannels, a series of SINR estimation devices that estimate the SINR for each of the code-subchannels, and a series of comparators thaw generate a multiple of power control bits that correspond to comparison results between the SINR estimates and a set of power threshold levels. These power control bits are transmitted to the mobile station and subsequently allow the mobile station to control the transmit powers for the physical channels individually.

35 Claims, 6 Drawing Sheets

POWER CONTROL OF A MULTI-SUBCHANNEL MOBILE STATION IN A MOBILE COMMUNICATION SYSTEM

FIELD OF THE INVENTION

This invention relates generally co power control within mobile communication systems and, in particular, to a system and method of power control within a Direct Sequence (DS)-Code Division Multiple Access (CDMA) system.

BACKGROUND OF THE INVENTION

In DS-CDMA communication systems, efficient power control of mobile station (MS) to basestation (BS) communications, hereinafter referred to as reverse link communications, is essential. One key consideration with respect to the transmit power levels in reverse link communications is interference caused by other MSs transmitting on the same channel, hereinafter referred to as co-channel MSs, in the same or neighboring cells. Hence, reduced transmit power levels result in a reduction in co-channel interference problems. Another key consideration is the limited battery power within the MSs, making it important to minimize unnecessary power consumption at the MSs. On the other hand, reverse link communication channels have a particular Quality of Service (QoS) requirement that must be met with a minimum transmit power. Thus, the transmit power level at the MS is a balance between co-channel interference/battery utilization and QoS requirements.

If each radio channel is static and the transmit power of each MS is properly allocated based on its geographical location, the level of co-channel interference and battery power utilization can be minimized so as to not severely affect the BS receiver's performance for any particular MS. However, since radio channels are time varying in a realistic environment, the signals sent from MSs and received at the BS experience power variations, due to the phenomenon known as channel fading, hereinafter referred to simply as fading.

To adjust for fading, previous standards for DS-CDMA communication systems have established the use of a power control command, consisting of a single power control bit, to be periodically transmitted from the BS to each MS communicating with the BS. Communications from the DS to the MS, hereinafter referred to as forward link communications, are used to transmit these power control commands. Each power control bit, according to previous setups, is generated in response to a power detection process for data signals received at the BS. These power control bits are systematically transmitted to the MSs in order to indicate whether the transmit power at a particular MS should be adjusted to compensate for power variations, such as fading, at the BS's receiver. If the power associated with the received data signals is found to be below a predetermined acceptable power threshold level, the BS indicates this by transmitting a high value on the power control bit. On the other hand, if the power associated with the received data signals is above the threshold level, the DS indicates this by transmitting a low value. In response to these power control bits, the MS increases the transmit power if a high value was sent and decreases the transmit power if a low value was sent. This allows for a dynamically controlled transmit power at the MSs that can compensate for each MS's particular situation.

The third generation DS-CDMA standard, referred to as the 3G DS-CDMA standard or cdma2000 in North America has been defined with increased flexibility when compared to previous standards. In the reverse link of a cdma2000 system, an MS is capable of simultaneously transmitting one pilot channel and one data channel, the data channel capable of being formed by code-multiplexing multiple code-subchannels that include fundamental, supplemental, and dedicated control channels. The pilot channel and the code-subchannels all pass through the same radio transmission environment and thus, all the signals experience the same fading. Because of this fact and the fact that code-subchannel signals are designed to be mutually orthogonal, it has been assumed that it is appropriate to apply a single bit to power control the entire MS transmitter, and this is consistent with proposed power control systems for cdma2000.

A problem with this approach is that when the subchannels are demodulated, the residual interference seen by each code-subchannel signal may be different clue to loss of orthogonality caused by the existence of multipaths in the radio transmission environment, and the different processing gains of the code-multiplexed subchannels. Thus, the variation of each code-subchannel's signal-to-interference-plus-noise ratio (SINR) may be different for a given fading rate. Further, each of these code-subchannels has its own quality of service (QoS) requirement. Hence, different code-subchannels can have different power limitations and requirements at the BS's receiver. The simple conventional power control systems discussed above are incapable of addressing these issues and may require more transmit power from the MSs than what would be ideally required to achieve the same QoSs.

SUMMARY OF THE INVENTION

It is an object of the present invention to overcome at least one of the disadvantages of the prior art and, in particular, to provide for more efficient selection of transmit power levels at MSs within mobile communication systems.

The invention provides an improved power control method for controlling a mobile station which transmits using several physical channels. A base station makes measurements for each of the physical channels independently, and as a function of those, produces either a single flower control bit which is used at the mobile station to adjust all transmit gains, or a power control bit for each physical channel which the mobile station uses to adjust transmit gains of each physical channel independently.

The present invention is, according to a first broad aspect, a method of controlling the transmit power of a mobile station that is operable to transmit a plurality of physical channels to a basestation simultaneously. The method includes steps of making power characteristic estimates for at least two of the physical channels and controlling the transmit power at the mobile station with use of the power characteristic estimates.

The present invention, according to a second broad aspect, is a power control apparatus arranged to be implemented within a basestation that can receive a plurality of physical channels from a mobile station simultaneously. In this aspect, the power control apparatus includes a plurality of receivers, a plurality of estimation devices, a power control bit generator and a power control bit transmitter. Each of the receivers preferably receives a data signal from the mobile station and separates a respective physical channel within the data signal. Each estimation device preferably receives one of the individual physical channels and makes a power characteristic estimate for the received physical channel. The power control bit generator preferably receives the power characteristic estimates and generates at least one power control bit on the basis of the estimates. The power control bit transmitter preferably transmits the power control bit to the mobile station.

The present invention, according to a third broad aspect, is a basestation including a receiver, a power control apparatus, and a transmitter. The receiver operates to receive a plurality of physical channels from a mobile station simultaneously, The power control apparatus operates to make power characteristic estimates for at least two of said physical channels. The transmitter operates to send transmit power control information to the mobile station with use of the power characteristic estimates.

The present invention, according to a fourth broad aspect, is a power control apparatus arranged to be implemented within a mobile station that is operable to transmit a plurality of physical channels to a basestation. The power control apparatus receives at least two power control bits from the basestation that correspond to different physical channels and adjusts transmit powers corresponding to the physical channels on the basis of the received power control bits.

In further aspects, the present invention is a basestation that operates to generate a plurality of power control bits and transfer them to a mobile station, and a mobile station that operates to receive a plurality of power control bits and adjust the transmit power for a plurality of physical channels on the basis of the received power control bits.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the present invention are described with reference to the following figures, in which.

DETAILED DESCRIPTION OF THE PREFERRED EMBODIMENTS

The preferred embodiments of the present invention are directed to a power control apparatus that can help control transmit power levels at a mobile station (MS), hence aiding in the control of reverse link transmit power. This power control apparatus is preferably implemented within a basestation (BS) though modifications may be required in the MS as well. In the preferred embodiments, the MS communicates with the BS via a plurality of physical channels in a mobile communication system. Preferably, the plurality of physical channels are code-subchannels within a cdma2000 communication system though this is not meant to limit the scope of the present invention. More specifically, physical channels are defined for some embodiments as channels which allow for the transmission of data information which are modulated with direct-sequence code-division spread-spectrum techniques and multiplexed onto one carrier frequency with other data information of the other channels. Further, it should be recognized chat the present invention could be implemented in any mobile communication system in which MSs transmit a plurality of physical channels to one or more BSs.

The key to the preferred embodiments is the ability of the power control apparatus to estimate the power of at least two of the physical channels as they are received at the BS and to perform closed loop power control of the transmit power of the MS based upon these estimates. Many methods of performing such closed loop power control can be used to achieve this end. Several preferred methods are described below.

Figure 1A:
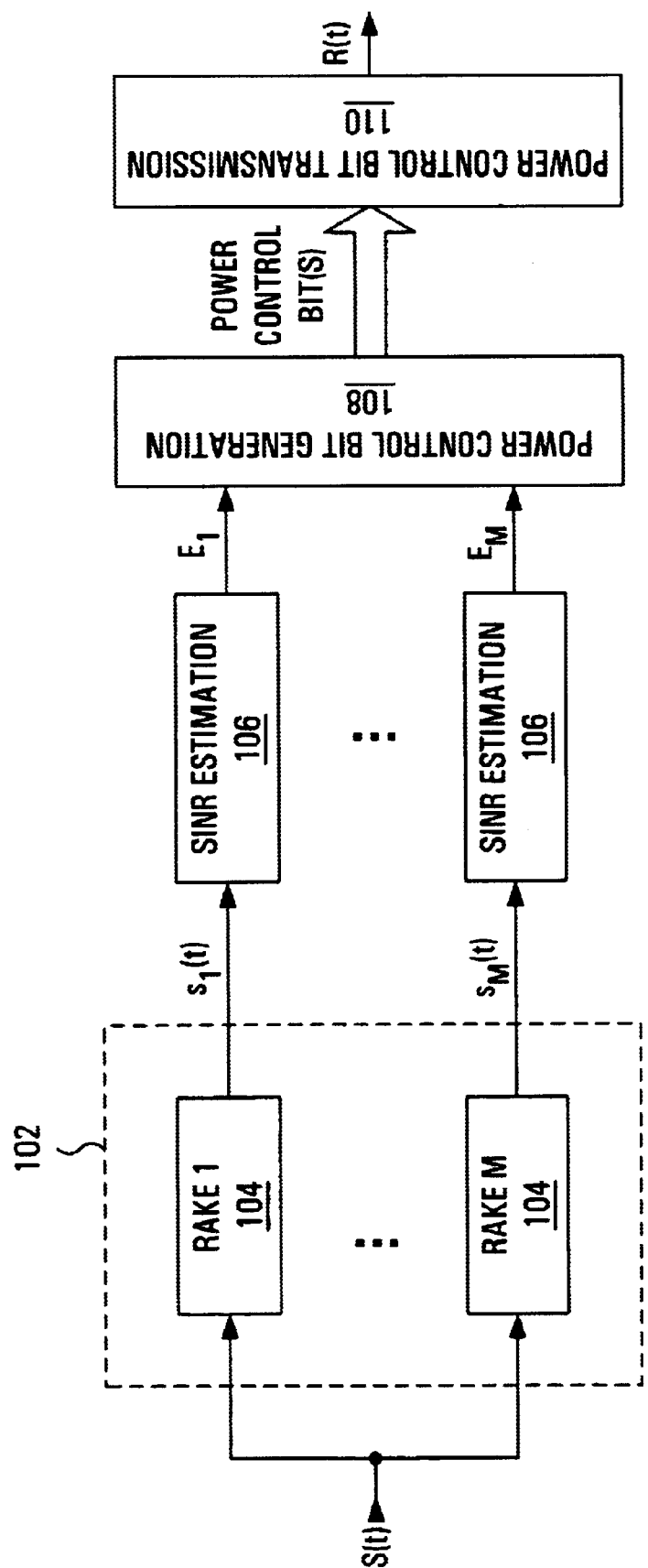
FIG. 1a is a simplified block diagram illustrating the functionality of a reverse link closed loop power control apparatus at a basestation according to a broad aspect of the present invention.

FIG. 1a is a simplified block diagram illustrating the functionality of a closed loop power control apparatus at the BS, according to the preferred embodiments of the present invention, which receives a data channel signal S(t) transmitted from an MS and outputs at least one power control bit that is to be further transmitted to the MS. The data channel signal S(t), according to the preferred embodiments, is a code-multiplexed signal comprising multiple code-subchannels. As depicted in FIG. 1a, the received data (channel signal S(t) is input to a data channel Rake 102 that comprises a plurality of individual code-subchannel Rakes 104 each of which comprises a filtering device. Each Rake 104 receives the data channel signal S(t) and separates a particular code-subchannel $s_1(t), s_2(t), \ldots, s_M(t)$ from the data channel signal S(t). For the cdma2000 example, there would be a separate Rake 104 for each fundamental channel, supplemental channel, and dedicated control channel. There would also be receive circuitry for the pilot channel.

These separated code-subchannels $s_1(t), s_2(t), \ldots, s_M(t)$ are each input to one of M Signal-to-Interference-plus-Noise Ratio (SINR) estimation blocks 106 that estimate the SINR of the input code-subchannels using an estimation method described in detail herein below. It is noted that, although the noise floor will be the same for all of the code-subchannels, the interference level might be different. The results of the SINR estimates $E_1, E_2, \ldots, E_M$ are subsequently input to a power control bit generation block 108 which is used to generate at least one power control bit. Subsequently, the result(s) of the generation block 108 are input to a power control bit transmission block 110 which subsequently transmits the power control bit(s) to the MS, for example over a data channel signal R(t).

Figure 1B:
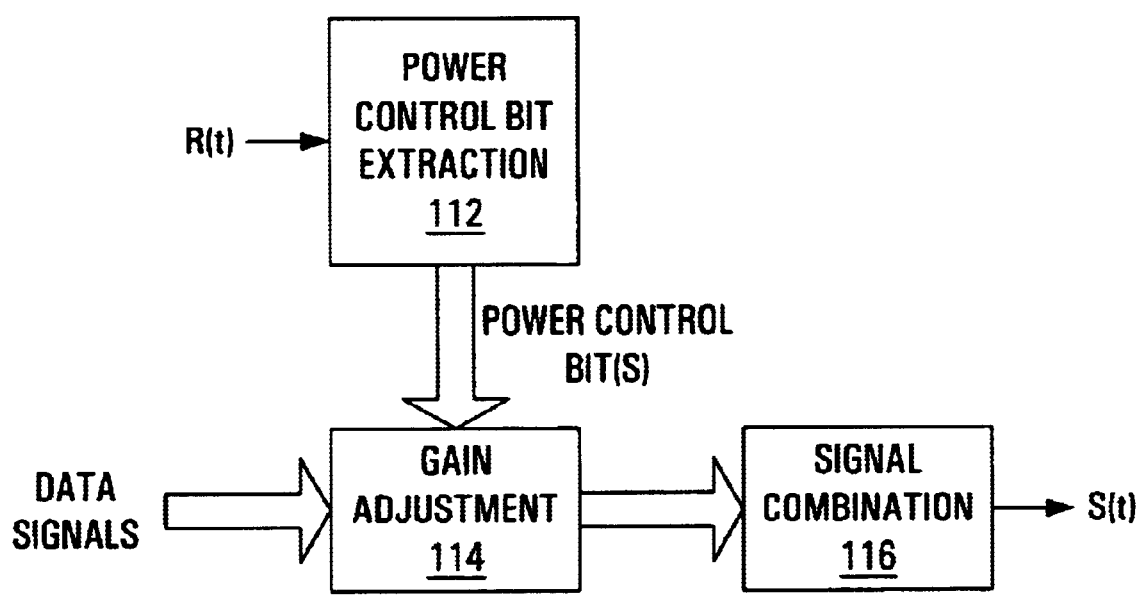
FIG. 1b is a simplified block diagram illustrating the functionality of a reverse link closed loop power control apparatus at a mobile station according to a broad aspect of the present invention.

FIG. 1b is a simplified block diagram illustrating the functionality of a closed loop power control apparatus at the MS, according to the preferred embodiments of the present invention, which operates in cooperation with the basestation's power control apparatus of FIG. 1a. The power control apparatus of FIG. 1b receives the data channel signal R(t), extracts the power control bit(s) transmitted from the BS, and adjusts the data channel signal S(t) to be transmitted to the BS. As depicted in FIG. 1b, the data channel signal R(t) is received at the MS within a power control bit extraction block 112. This power control bit extraction block 112 separates then power control bit(s) from the data channel signal R(t) used for transmitting them and outputs the power control bit(s) to a gain adjustment block 114. The gain adjustment block 114 receives a plurality of signals from other components (not shown) within the MS and the power control bit(s) from the power control bit extraction block 112, and further outputs the signals with adjusted gains to a signal combination block 116. The signal combination block 116 combines these gain adjusted signals and outputs the data channel signal S(t) to be transmitted to the BS. For the cdma2000 example, the signal combination block 116 can be the conventional hardware/software used to combine the pilot channel, fundamental channel, supplemental channel (s), and dedicated control channel, but with adjusted gains as determined by the gain adjustment block 114. These channels in the cdma2000 example are Walsh-code modulated data signals.

There are a number of key differences among the preferred embodiments as will be described in detail herein below. These differences primarily lie in the implementation of the power control bit generation block 108, the number and methods of calculating the predetermined SINR threshold level(s), the number of power control bits that are transmitted by the power control bit transmission block 110, and the implementation of the gain adjustment block 114 within the MS. Although each preferred embodiment that is described has different advantages and disadvantages, each maintains further advantages over well known reverse link power control apparatuses as will be described herein below with reference to FIGS. 2 through 5.

Figure 2:
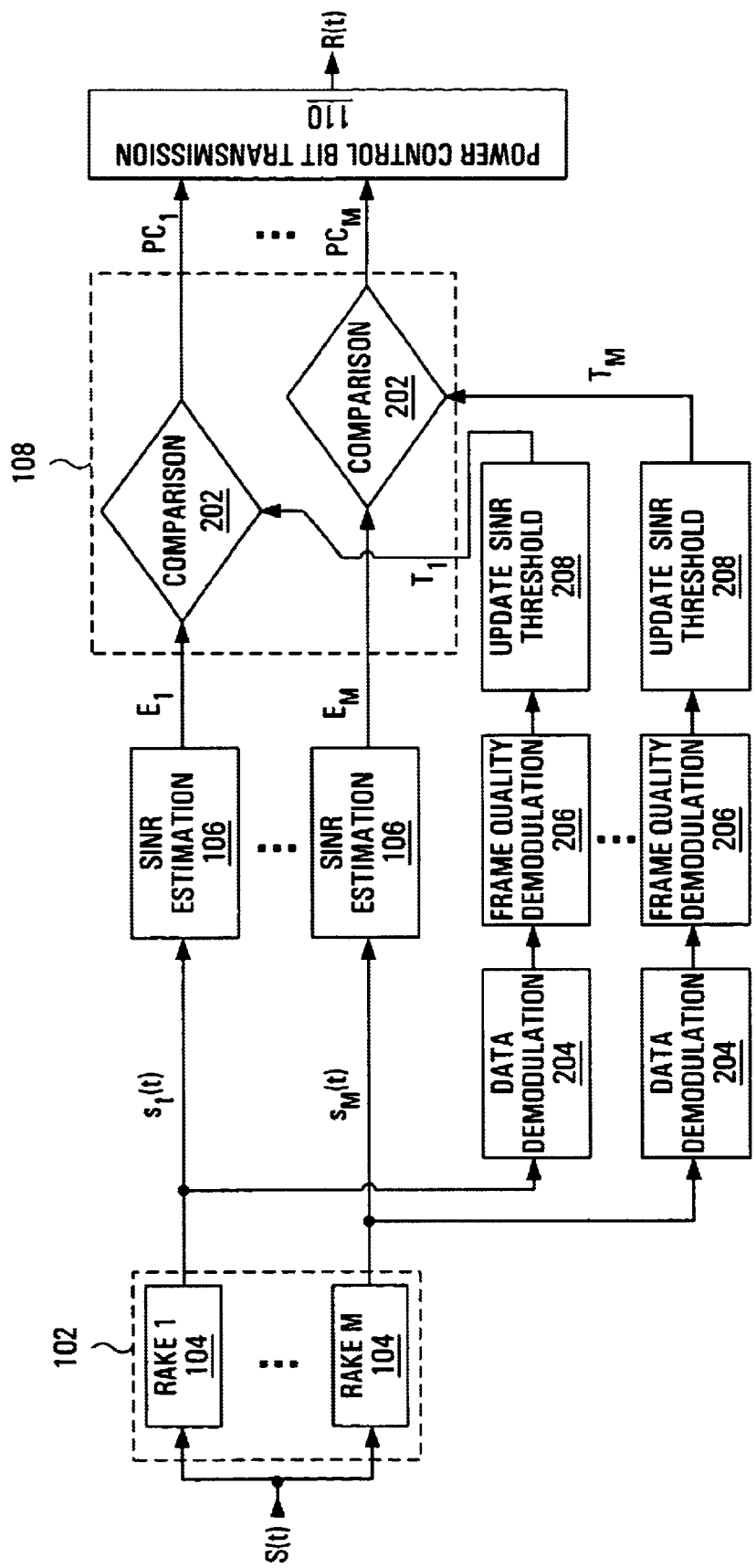
FIG. 2 is a block diagram illustrating the functionality of a reverse link closed loop power control apparatus at a basestation according to a first preferred embodiment of the present invention.

In a first preferred embodiment of the present invention, as is now described with reference to FIG. 2, the SINR estimates $E_1, E_2, \ldots, E_M$ are used to generate independent power control bits corresponding to each of the code-subchannels for which estimates were made. In this first preferred embodiment, the power control bits are used to adjust the transmit power of a plurality of code-subchannels independently, as will be described in detail herein below with reference to FIG. 3. This can provide a better performance than a single common power control bit when the data rates on the subchannels are not the same.

According to this first preferred embodiment depicted within FIG. 2, the power control apparatus comprises the data channel Rake 102; a power control bit generation and transmission path, hereinafter referred to as the inner loop power control path, comprising the plurality of SINR estimation blocks 106, the power control bit generation block 108 that comprises a plurality of individual comparators 202, and the power control bit transmission block 110; and an SINR threshold generation path, hereinafter referred to as the outer loop power control path, comprising a plurality of data demodulation blocks 204, a plurality of frame quality determination blocks 206, and a plurality of update SINR threshold blocks 208.

As in FIG. 1a, the data channel Rake 102 comprises a plurality of individual Rakes 104, each comprising a filtering device which receives the same data signal S(t) and separates a particular code-subchannel $s_1(t), s_2(t), \ldots, s_M(t)$. These code-subchannel signals $s_1(t), s_2(t), \ldots, s_M(t)$ are independently input to separate SINR estimation blocks 106 and separate data demodulation blocks 204. It its noted that, although not shown, the data signal S(t) also typically comprises a pilot channel that is used to detect the quality of the transmission channel and determine whether a handoff is required. Preferably, this pilot channel is not utilized in the first preferred embodiment for the closed loop power control of the code-subchannels $s_1(t), s_2(t), \ldots, s_M(t)$, but rather the code-subchannels are used to effect power control of the pilot channel.

Within the inner loop power control path, the estimation algorithm utilized within the SINR estimation blocks 106 will be described herein below in detail for the preferred embodiments. As depicted within FIG. 2, the results of these SINR estimates $E_1, E_2, \ldots, E_M$, according to the first preferred embodiment, are each input to respective independent comparators 202 within the power control bit generation block 108. In the comparators 202, each of the SINR estimates $E_1, E_2, \ldots, E_M$ is compared to a corresponding SINR threshold value $T_1, T_2, \ldots, T_M$ generated with use of the outer loop power control path described herein below. According to this preferred embodiment, if a particular estimate $E_1, E_2, \ldots, E_M$ is less than the corresponding threshold value $T_1, T_2, \ldots, T_M$, then a high value is output from the particular comparator 202 and, if a particular estimate $E_1, E_2, \ldots, E_M$ is greater than the corresponding threshold value $T_1, T_2, \ldots, T_M$, then a low value is output from the comparator 202. The results from the comparators 202 represent a plurality of power control bits that are input to the power control bit transmission block 110. This power control bit transmission block 110 is used to transmit the plurality of power control bits $PC_1, PC_2, \ldots, PC_M$.

Figure 3A:
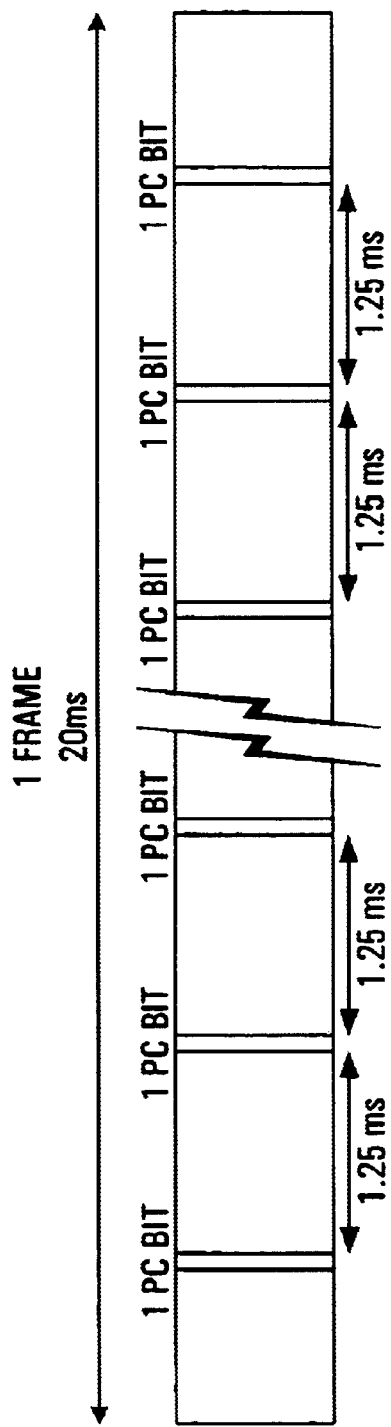
FIGS. 3a and 3b respectively illustrate a well-known simplified frame structure and a simplified frame structure according to one embodiment of the present invention.

These power control bits $PC_1, PC_2, \ldots, PC_M$ can be transmitted to the MS using any convenient manner. Preferably they are transmitted to the MS by replacing data bits within a frame being sent to the MS. In previous closed loop power control apparatuses a single power control bit replaces a data bit 16 times within a single frame of 20 ms. This is illustrated in FIG. 3a. This process of replacing data bits is normally called puncturing. The removing of data bits through puncturing does not cause any real loss of data since well known error correction techniques are utilized to correct for the missing bits.

Figure 3B:
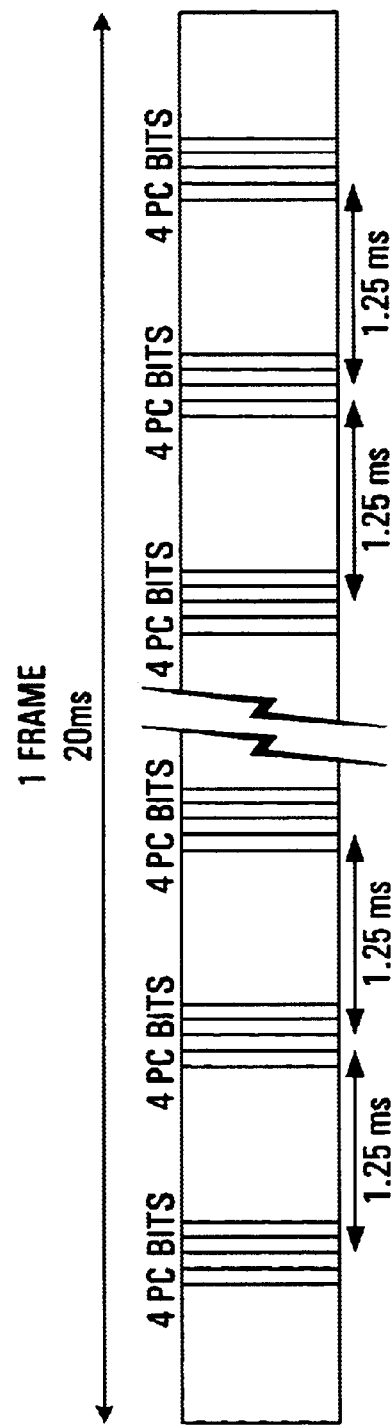

In one embodiment of the present invention, the plurality of power control bits $PC_1, PC_2, \ldots, PC_M$ according to the first preferred embodiment of the present invention, are punctured as a group within the frame, replacing a plurality of consecutive data bits. This is illustrated in FIG. 3b for the case that four power control (PC) bits replace four consecutive data bits 16 times within a single frame of 20 ms. In another embodiment, the power control bits $PC_1, PC_2, \ldots, PC_M$ are individually punctured at different times, similar to that illustrated in FIG. 3a, in order to reduce the chances of causing an error that is not correctable with error correction techniques. Overall, one skilled in the art would understand that the method of transmission for the power control bits and the frequency of those transmissions is variable depending on the particular implementation and should not be used to limit the scope of the present invention.

The operation of the MS after receiving the power control bits, according to the first preferred embodiment of the present invention, is now described in detail with reference to FIG. 4. As depicted within FIG. 4, a plurality of data subchannels $CH_1, CH_2, \ldots, CH_M$ are input independently to orthogonal modulation blocks 402 with the results subsequently being input to the gain adjustment block 114 along with a pilot channel PCH if present. The outputs from the gain adjustment block 114 are input to a combination and complex spreading block 404 that outputs a data signal S(t) to be sent to the BS. In this first preferred embodiment, the operation of transmitting the data subchannels $CH_1, CH_2, \ldots, CH_M$ and the pilot channel PCH is not modified from well known operations with the exception of the power control bit extraction block 112 and the gain adjustment block 114.

While previous closed loop power control setups at the MS extract a single power control bit and adjust all of the channels based upon it, the gain adjustment for the subchannels according to the first preferred embodiment is performed independently. First, a received signal R(t) from the BS is input to the power control bit extraction block 112 similar to that of FIG. 1b. It should be understood that received signals R(t) would also be input to a demodulation system that is not shown. Preferably, the power control bit extraction block 112 determines the power control bits transmitted by the BS based on predetermined information concerning specific data bits within a frame that are to be replaced with power control bits for particular subchannels.

Figure 4:
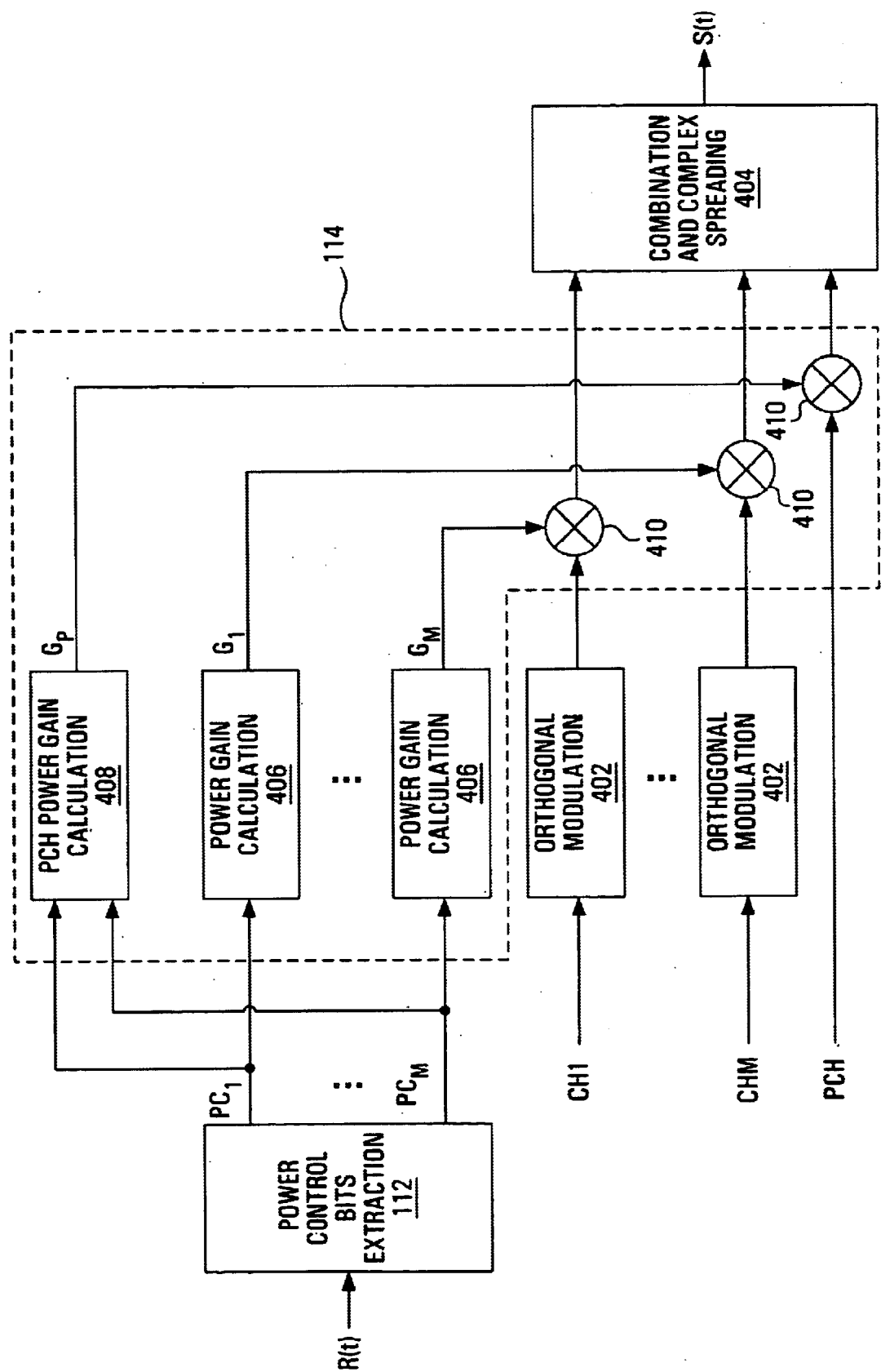
FIG. 4 is a block diagram illustrating the functionality of a reverse link closed loop power control apparatus at a mobile station according to the first preferred embodiment of FIG. 2.

As depicted within FIG. 4, the gain adjustment block 114 comprises a plurality of power gain calculation blocks 406, a pilot channel power gain calculation block 408, and a plurality of multipliers 410. The extracted power control bits $PC_1, PC_2, \ldots, PC_M$ are respectively input, according to the first preferred embodiment, to the power gain calculation blocks 406 which determine the gain $G_1, G_2, \ldots, G_M$ to adjust each subchannel $CH_1, CH_2, \ldots, CH_M$. These gain values $G_1, G_2, \ldots, G_M$ are determined preferably by adding or subtracting a predetermined or dynamically varying power level step size from the gain previously determined from the last power control calculation; adding the step size if the power control bit is high while subtracting the step size if the power control bit is low.

The power level step size in one embodiment is a common constant value for all of the subchannels. In other embodiments, there are two or more constant step sizes that are used for the plurality of subchannels and, in further embodiments, there is a unique constant step size for each individual subchannel.

In yet further embodiments, the common step size for the subchannels is determined dynamically by a formula such as:

$$\text{stepsize} = C \Sigma c_m p_{mn} \quad (1)$$

where C is a constant step size, $c_m$ is the mth power control bit (power control bits being 1 or 0), and $p_{mn}$ is the power of the mth subchannel normalized to the total transmit power determined during the previous power adjustment. Hence, the step size according to equation (1) is dynamic in the sense that it increases with the number of power control bits that are high (i.e. equal to 1). This embodiment will reduce the redundant amount of total transmit power and can be particularly useful when the power control speed is relatively fast for a given fading environment.

Further, as depicted within FIG. 4, all of the power control bits are preferably input to the pilot channel power gain calculation block 408. In this preferable embodiment, the pilot channel gain $G_p$ is calculated in a similar manner as described for the data channels $CH_1$–$CH_M$, but with the predetermined power level step size being added if any of the power control bits were high. In alternative embodiments, the pilot channel gain $G_p$ is adjusted based upon the power control bit of a particular data channel such as a fundamental channel. In further alternative embodiments, the pilot channel PCH has its own power control bit similar to those described herein above for the data channels $CH_1, CH_2, \ldots, CH_M$.

Once the gains $G_1, G_2, \ldots, G_M$ of the data channels and the gain $G_p$ of the pilot channel have been determined, they are independently input to respective multipliers 410. These multipliers 410 each take as inputs a modulated data channel or a pilot channel along with the corresponding gain value and outputs a scaled signal that is ready for combination and complex spreading.

The initial gains may be assigned using open loop power control. Many different approaches to this may be followed and one preferred approach will be described. To begin, the BS measures the total power levels from MSs within the same cell to determine the total intracell interference, along with measuring other interference sources such as thermal noise. The BS subsequently sends this information, along with other information such as its transmit power level, to the MS using a higher layer protocol. Preferably, when the MS receives this intra-cellular interference, noise, and transmit power level information from the BS, the MS extracts the path loss by subtracting its received power level from the transmit power level, estimates a channel gain $G_1, G_2, \ldots, G_M$ for each of the individual code-subchannels, and selects an appropriate initial transmit power level for each subchannel. The extraction of the path loss and the corresponding selection of the initial transmit power is preferably based on well known algorithms, but the utilization of this information for the selection of gains for each subchannel has not previously been performed. Further, the MS preferably sets the initial power level for its pilot channel to a predetermined fraction of the maximum power level among its subchannels.

Referring back to FIG. 2, the operation of the outer loop power control path is now described with respect to the calculation of SINR threshold levels according to the first preferred embodiment of the present invention. The outer loop power control, according to the first preferred embodiment, updates the individual subchannels' SINR threshold levels $T_1, T_2, \ldots, T_M$ by increasing/decreasing each of the levels by predetermined step sizes at regular intervals such as once every frame. Preferably, for each of the subchannels, a data demodulation block 204, a frame quality determination block 206, and an update SINR threshold block 208 operate together to generate the corresponding SINR threshold level. Each of the demodulation blocks 204 operate to demodulate the data information corresponding to the particular subchannel signal $s_1(t), s_2(t), \ldots, s_M(t)$ that is input. Each of the frame quality determination blocks 206 operate to input the demodulated data information within a frame, which was encoded by an outer code such as a Cyclic Redundancy Check (CRC) code, from a corresponding demodulation block 204; to cheek the quality of the frame by decoding the data information from the outer code; and to determine if the frame is in error. It is noted that in normal operation, the demodulation blocks 204 and the frame quality determination blocks 206 are present for data processing purposes and therefore the operation of such blocks would be well understood by one skilled in the art.

There are known outer loop power control systems that currently operate for a single channel or subchannel such as a fundamental channel. The operation of the update SINR threshold blocks 208 depicted within FIG. 2 preferably operate similar to the operation of similar blocks within these well understood outer loop power control systems that generate a single SINR threshold value. The key difference between these systems is that in previous outer loop power control systems there was only one such block and not a plurality such as that depicted within FIG. 2 for the first preferred embodiment.

In a similar manner to the step size associated with each subchannel at the power gain calculation blocks 406 in the MS, the determination of the step size for the SINR threshold levels can be implemented in numerous ways. In one embodiment, a predetermined constant SINR threshold step size can be used for each subchannel. In another embodiment, the step size is determined with use of the following formula:

$$stepdown = \frac{stepup}{(1/targetFER) - 1} \quad (2)$$

where stepup and stepdown are the threshold level adjustment up and the threshold level adjustment down respectively, and the targetFER is the target Frame Error Rate for the particular subchannel. Equation (2) is a well known formula that when given an initial stepup value and a targetFER value, determines the stepdown value that should be utilized every frame in the following error cycle. It can be seen from equation (2) that the amount of power increased over an error cycle will be equal to the amount of power decreased over the same period. An error cycle is defined herein as the time interval between two consecutive erroneous frames. The key difference in preferable embodiments of the present invention over well known implementations is that equation (2) is used for each subchannel with its associated values of stepup and targetFER, resulting in independent changes for multiplex subchannels.

As part of the outer power control system, the BS further monitors all the subchannels carrying blind data rates, that being data rates which are a priori unknown to the BS, such as the Fundamental channel. Monitoring a subchannel carrying a blind rate and detecting its rate change can be achieved using well known algorithms such as performing frame quality checking for all possible rates within the frame quality demodulation blocks 206. If a sudden change in the data rate is observed within one of these subchannels, the SINR threshold value is preferably reset to a predetermined initial reference value for the new rate.

There are numerous advantages to the first preferred embodiment of the present invention over well known power control systems. For one, the use of multiple power control bits can reduce redundant power consumption in particular propagation channels compared to single power control bit implementations. This multiple power control bit implementation allows each subchannel to be adjusted substantially close to its optimal transmit power level rather than being adjusted purely based upon a single power control bit that corresponds to just one of the plurality of individual subchannels. This increased efficiency can reduce the interference caused within each cell and increase the cell's capacity if a plurality of reverse link subchannels are being sent from a single MS, can ensure that the minimum QoS of each subchannel is maintained, and can reduce the amount of MS battery power that is utilized.

In other embodiments of the presence invention a single power control bit is utilized which is consistent with prior art setups. The key difference between these embodiments of the present invention and the prior art setups is the method used to calculate the single control bit.

For instance, one alternative to the first preferred embodiment described herein above utilizes a single power control bit. In this alternative embodiment, the BS makes a plurality of comparisons described above and combines the results, for example using a logical OR operation on the comparison results, hence outputting a single power control bit which is high if any one of the comparison results is true. The single power control bit can be sent by traditional methods to the MS and does not require changes to the structure of an MS.

It is noted that despite having each subchannel adjusted with the same power control bit, the absolute amount of increased or reduced power can be different for each subchannel since a power ratio can be preset that defines the difference in power levels of the different subchannels. Moreover, those power ratios can be dynamically set using a higher layer protocol.

A second preferred embodiment of the present invention that utilizes a single power control bit is now described in detail with reference to FIG. 5. As depicted within FIG. 5, the closed loop power control apparatus according to the second preferred embodiment is similar to that of the first preferred embodiment depicted within FIG. 2, but with a number of additions and modifications. The operation of the data channel Rake 102, the SINR estimation blocks 106, the data demodulation blocks 202, the frame quality determination blocks 204, and the update SINR threshold blocks 206 are identical in this second preferred embodiment to that described previously for the first preferred embodiment.

Figure 5:
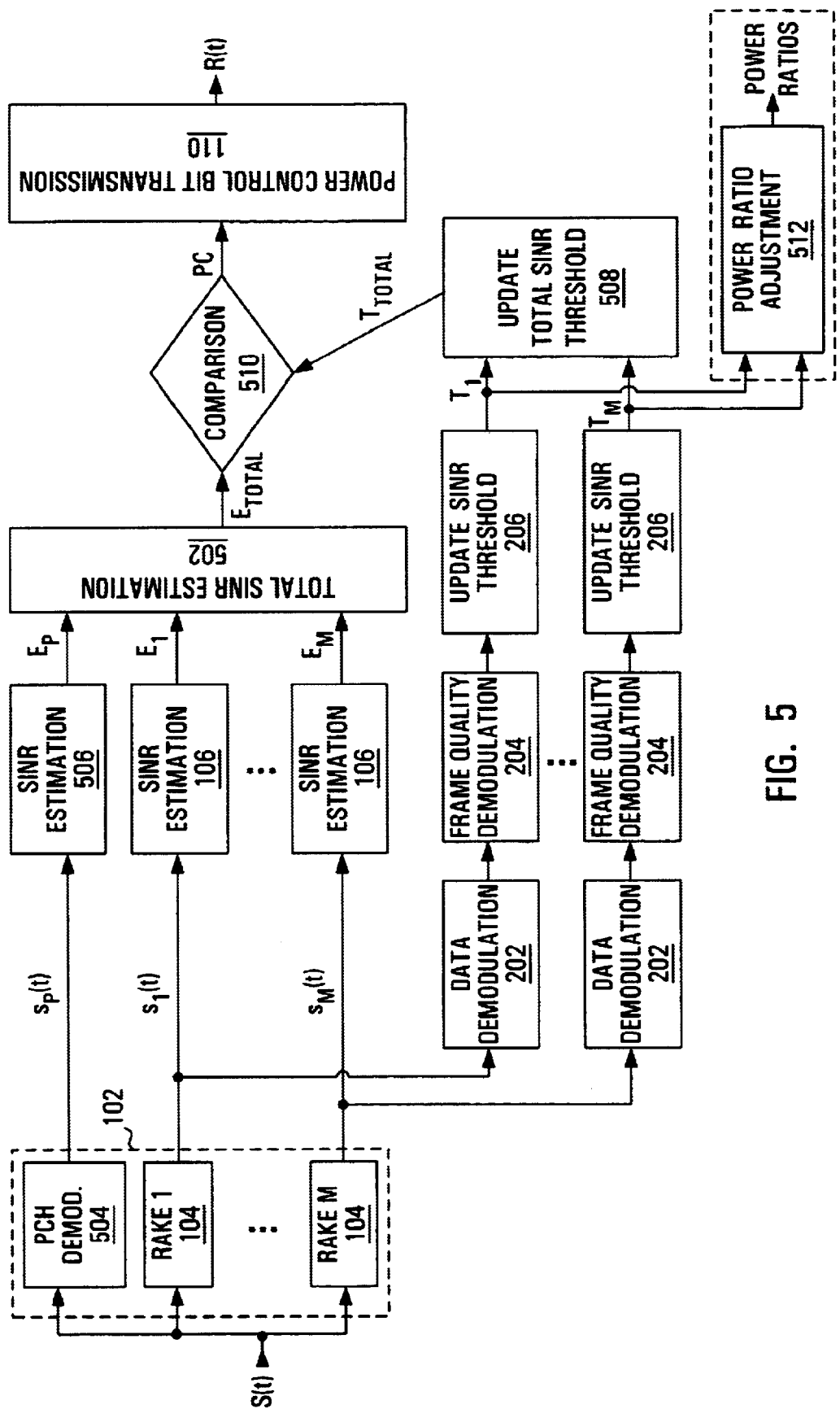
FIG. 5 is a block diagram illustrating the functionality of a reverse link closed loop power control apparatus at a base station according to a second preferred embodiment of the present invention.

In the second preferred embodiment as depicted in FIG. 5, the SINR estimates $E_1, E_2, \ldots, E_M$ output from the SINR estimation blocks 106 are input to a total SINR estimation block 502 which combines these plurality of individual SINR estimates into a single total SINR estimate $E_{total}$. In one embodiment, the individual SINR estimates are averaged in order to generate this combination of estimates though other techniques are utilized in other embodiments. In one preferable embodiment, an estimate of each subchannels total signal power $P_{b,mn}$ and an estimate of each subchannel's interference power $P_{r,mn}$ are made by the SINR Estimation blocks 106 and transferred to the total SINR estimation block 502. The total SINR estimation block 502 then utilizes these estimates by totalling the subchannel's total signal power and dividing this value by the subchannel's total interference power, hence generating a total SINR estimate $E_{total}$.

Further according to the second preferred embodiment, the individual SINR threshold levels $T_1, T_2, \ldots, T_M$ for the individual subchannels are input to an update total SINR threshold block 508 which combines the input SINR threshold levels into a total SINR threshold value $T_{total}$. Preferably, this combining is done by averaging the input SINR threshold levels. It is noted that, according to the second preferred embodiment, the individual SINR threshold levels can be updated by increasing/decreasing each of them by a step size similar to that described herein above for the first preferred embodiment. In an alternative embodiment, the step size is added or subtracted from the total SINR threshold value $T_{total}$.

In FIG. 5, the total SINR estimate $E_{total}$ and the total SINR threshold value $T_{total}$ are both input to a comparator 510, which along with the total SINR estimation block 502 makes up the power control bit generation block 108 depicted in FIG. 1a. In the second preferred embodiment, if the total SINR estimate $E_{total}$ is greater than the total SINR threshold value $T_{total}$, then the output from the comparator 510 is low; while if the total SINR estimate $E_{total}$ is less than the total SINR threshold value $T_{total}$, then the output is high. Similarly to previous well known techniques, the single power control bit corresponding to the output of the comparator 510 is transmitted to the MS with use of the power control bit transmission block 110.

In an exemplary version of this second preferred embodiment, the data channel Rake 102 further includes a pilot channel (PCH) demodulator 504 that separates a pilot channel signal $s_p(t)$ from the data signal $S(t)$ and the closed loop power control apparatus further comprises a SINR estimation block 506 that receives the pilot channel signal $s_p(t)$. In this exemplary embodiment, a SINR estimate $E_p$ for the pilot channel is further utilized by the total SINR estimation block 502 to generate the total SINR estimate $E_{total}$. The SINR for the pilot channel is preferably determined when the transmitted power ratio between the pilot channel and a subchannel is known to the BS. Thus, the total SINR estimation block 502 can utilize this information to determine the total SINR estimate $E_{total}$ in addition to the measured SINR values of the subchannels. The total SINR estimate $E_{total}$ is determined so that the ratio between the pilot channel's estimated SINR and the particular subchannel's estimated SINR does not exceed the known ratio, In one embodiment, the particular subchannel corresponds with the subchannel with the highest transmit power.

It is frequently the case in existing designs that a pilot channel is typically transmitted from the MS to the BS in order that the BS may detect the quality of the transmission channel and determine whether a handoff is required. The additional estimate of a pilot channel SINR estimate $E_p$ can be used to improve the generation of the power control bit in the second preferred embodiment. In the first preferred embodiment, estimating the SINR for the pilot channel, and subsequently generating a separate power control bit for it, is unnecessary since the transmit power of the pilot channel can be determined in other manners as described previously and the power control bit for each subchannel is directly generated based upon the SINR estimate of the subchannel. Despite this, as stated previously, an alternative embodiment of the first preferred embodiment generates and utilizes a separate power control bit for the pilot channel.

Within one embodiment of the present invention that utilizes a single power control bit such as those described herein above, the relative gains between the subchannels are fixed. In exemplary versions of these single power control bit embodiments, the individual SINR threshold values $T_1, T_2, \ldots, T_M$ are input to a power ratio adjustment block 512 that calculates and transmits to the MS, via a higher level protocol, power ratios between the subchannels. Preferably, the power ratio adjustment block 512 accumulates the individual SINR threshold values $T_1, T_2, \ldots, T_M$ over a predetermined period and compares the accumulated values to yield a power ratio for each subchannel with respect to a reference value such as the highest or lowest accumulated SINR threshold value among the subchannels. This information can be utilized to dynamically adjust the relative power levels between the individual subchannels at the MS.

The advantage of the embodiments that utilize a single power control bit over the first preferred embodiment is that certain standards such as cdma2000 are not required to be changed in order to transmit the power control bits and adjust the power gain at the MS. At the same time, these alternative embodiments still are capable of being more efficient than traditional closed loop power control methods since the power control bit that is sent to the MS takes into account all of the subchannels' estimated SINRs which is more thorough than only performing a single estimate on a single subchannel without regard to the other subchannels' situations.

There are advantages and disadvantages to both the first and second preferred embodiments of the present invention. The first preferred embodiment can achieve near optimal QoS for each of the subchannels, but requires the use of a plurality of power control bits. The second preferred embodiment, on the other hand, does not necessarily achieve the optimal QoS for each subchannel, but only utilizes a single power control bit that is consistent with current standards.

A compromise embodiment that minimizes the disadvantages of both of these preferred embodiment is now described as a third preferred embodiment of the present invention. In the closed loop power control system of this third preferred embodiment, both the first and second preferred embodiments are implemented within the BS. A single power control bit similar to that generated for the second preferred embodiment is generated and used for a first portion of inner loop power control while multiple power control bits consistent with the first preferred embodiment are generated and used for a second portion of inner loop power control. The single power control bit is transmitted to the MS for regular power control similar to the current standards and the multiple power control bits are transmitted periodically possibly by a higher level protocol. As well, similar to the exemplary embodiment of the second preferred embodiment, an exemplary version of the third preferred embodiment generates the values of optimal relative gains between the subchannels and sends these relative gains via a higher level protocol during situations in which the data rate is suddenly changed.

The theory used for an exemplary method of generating estimates for a subchannel's SINR is now described in detail. Estimating the SINR accurately is a critical part of the overall closed loop power control system. For a DS-CDMA signal, the SINR of a symbol can be measured after despreading over a processing gain period which is typically a symbol duration. A spread chip signal $s(t)$ can be represented by the following formula:

$$s(t) = \sum_{k=0}^{L-1} \frac{\sqrt{w}}{L} bc(t - kT_c) \quad (3)$$

where w is the symbol energy, b is the symbol $\{-1, 1\}$, $c(t)$ is the chip signal, $T_c$ is the duration of a chip, and L is the processing gain for the symbol. When $s(t)$ is received at a BS receiver, assuming one sample per chip for mathematical simplicity, the received signal $r(t)$ can be written as:

$$r(t) = \sum_{k=0}^{L-1} \frac{\sqrt{w}}{L} bc(t - kT_c)\delta(t - kT_c) + \sum_{k=0}^{L-1} n_k \delta(t - kT_c) + \sum_{k=0}^{L-1} I_{os,k} \quad (4)$$

where $n_k$ represents the background or thermal noise at the kth sampling time and $I_{os}$ represents all other interfering chip signals. $\delta(t)$ is used to indicate a proper sampling instant of the received signal and noise. A despread symbol signal $r_d$ is obtained by multiplying $r(t)$ by $c(t)$ and summing up all samples for the processing gain (i.e., symbol) period and therefore can be expressed by the following formula:

$$\begin{aligned} r_d &= \sum_{k=0}^{L-1} r(t)c(t) \\ &= \sum_{k=0}^{L-1} \frac{\sqrt{w}}{L} b + \sum_{k=0}^{L-1} n_k c(t - kT_c)\delta(t - kT_c) + \sum_{k=0}^{L-1} I_{os,k} c \\ &\quad (t - kT_c)\delta(t - kT_c) \end{aligned} \quad (5)$$

The squared value of $r_d$ represents the total power $P_t$ of a symbol signal and noise and can be represented by the following formula:

$$p_t = r_d^2 = \left(\frac{\sqrt{w}}{L}bL\right)^2 + \eta + P_I + R_{sn} + R_{sI} + R_{nI} \qquad (6)$$

where $\eta$ and $P_I$ are the noise power and residual interference power after despreading respectively. They can be expressed by the following formula:

$$\eta = \left(\sum_{k=0}^{L-1} n_k c(t-kT_c)\delta(t-kT_c)\right)^2 \qquad (7)$$

$$P_I = \left(\sum_{k=0}^{L-1} I_{os,k} c(t-kT_c)\delta(t-kT_c)\right)^2 \qquad (8)$$

$R_{sn}$, $R_{sI}$, and $R_{nI}$ are terms resulting from multiplication of signal, noise, and interference power levels. Since an estimate of SINR is in fact an averaged estimate of SINR over a certain period, with the noise being an independently distributed zero mean process and uncorrelated with the chip signal, the expected values for $R_{sn}$, $R_{sI}$ and $R_{nI}$ will become zero if the averaging period is sufficiently long. Hence, the expected value of the total power can be approximated by the following formula:

$$E\{P_t\} = w + E\{n^2\} + E\{P_I\} \qquad (10)$$

and the resulting SINR can be written as $$SINR = \frac{w}{\sigma^2 + E(P_I)} \qquad (11)$$

where $E\{n^2\} = \sigma^2$ is the variance of the noise.

The SINR estimates, according to the preferred embodiments of the present invention, are performed in a similar manner to that described above for the theoretical algorithm, but with a slightly improved noise power measurement. Since the noise is a random process, if the averaging period is not relatively long enough, the noise power may not be accurately estimated. This is particularly true for a lower rate data transmission. According to the preferred embodiments of the present invention, an estimate of signal power is determined by accumulating noise samples for K previous power control groups (pcg) in order to estimate the noise power in the current pcg and subtracting this estimated noise power from the total power of the current pcg. This can be represented by a sequence of equations that follow:

$$I\text{-arm: } \sqrt{w}b + n_I = x \qquad (12)$$

$$Q\text{-arm: } n_Q = y \qquad (13)$$

where $n_I$ and $N_Q$ represent the in-phase and quadrature components of the sum of thermal noise and residual interference power. By defining $u_j^2 = x^2 + y^2$ and using equation (12) and (13), it can be seen that the signal energy $E_b$ can be represented by:

$$E_b = E(wb^2)_{1pcg} = E\{u_j^2\}_{1pcg} - (E\{n_I\}_{1pcg} + E\{n_I\}_{1pcg}) \qquad (14)$$
$$= E\{u_j^2\}_{1pcg} - 2\sigma_n^2$$

Since $\sigma_n^2 \neq I_o$ when the number of samples for averaging is not sufficient, the interference-noise power $\sigma_n^2$ can be obtained by averaging the samples over an extended period and can be represented by:

$$\sigma_n^2 = E\{n_Q\}_{Kpcg} \qquad (15)$$

and finally, using the new interference-noise power, the signal energy $E_b$ becomes $$E_b = E\{u_j^2\}_{1pco} - 2\sigma_n^2 \qquad (16)$$

where $\sigma_n^2 = I_o$. The SINR can be estimated by dividing the signal energy $E_b$ calculated by equation (16) by the interference-noise power $\sigma_n^2$ calculated with equation (15).

In the preferred embodiments described previously, the estimate of signal power given in equation (12) and the estimate of noise power given in equation (13) would be supplied to the SINR estimation blocks 106 by the individual code-subchannel Rakes 104. Further in the preferred embodiments, the signal estimation blocks 106 would subsequently calculate the average noise power given in equation (15) and the signal energy in equation (16) prior to estimating the SINR by dividing the results.

The preferred embodiments of the present invention have been described in broad terms herein above. In an exemplary embodiment of these preferred embodiments, the mobile communication system in which the MS and BS operate is a cdma2000 communication system and the plurality of code-subchannels comprise a fundamental channel, supplemental channel, and dedicated control channel. In this specific embodiment, there would be three SINR estimation blocks 106, one for each of the individual code-subchannels. As well, for the first preferred embodiment, this specific implementation would have three power control bits that correspond to the three subchannels.

Although the present invention has been described in detail with regard to three preferred embodiments, these are not meant to limit the scope of the present invention. In fact, it should be understood that alternative embodiments are possible that measure a power characteristic for at least two physical channels, that are possibly code-subchannels but are not limited to code-subchannels, and that use these estimates to control the transmit power of an MS. In the preferred embodiments, the control of the MS is performed with use of one or more power control bits, but this should not limit the scope of the present invention since other methods of reverse link power control can gain benefits in utilizing estimates for at least two physical channels. For instance, power control commands could be transmitted on a dedicated control channel which utilize the SINR estimates to determine the transmit power at the MS.

Further, although the preferred embodiments were described for the estimating of SINRs, it should be understood that other power characteristics of the individual channels could be estimated and used to aid in the control of the MS's transmit power.

Yet further, despite the first preferred embodiment defining a separate power control bit for each physical channel, the present invention could be implemented such that there is a separate power control bit for a respective group of physical channels; each group of physical channels preferably being defined by data rate and including one or more separate physical channels. Hence, only one physical channel within a particular group would have its SINR estimated and compared to an SINR threshold to generate a power control bit. The remaining physical channels within the group would utilize the power control bit determined for the group.

Persons skilled in the art will appreciate that there are yet more alternative implementations and modifications possible to implement an apparatus and method similar to that described above and that the above implementation is only an illustration of this embodiment of the invention. The scope of the invention, therefore, is only to be limited by the claims appended hereto.

What is claimed is:

1. A method of controlling a transmit power of a mobile station with a base station operable to receive a plurality of physical channels from the mobile station simultaneously, the method comprising for each power control period:
   estimating a power characteristic of at least two of said physical channels, for each of at least two physical channels, the power characteristic being determined as a function of a signal power, a noise power and an interference power with the noise power and interference power being determined from a plurality of power samples from previous power control periods; and
   controlling the transmit power of each of the plurality of physical channels at the mobile station by sending at least one power control command to the mobile station determined with use of the power characteristic estimates with an objective that at least a respective minimum quality of service of each physical channel is maintained.

2. A method according to claim 1, wherein the controlling the transmit power at the mobile station comprises generating a power control bit corresponding to each of the power characteristic estimates.

3. A method according to claim 1, wherein the estimating a power characteristic of at least two of said physical channels comprises estimating a power characteristic for each of said physical channels.

4. A method according to claim 3, wherein the power control commands comprise a power control bit corresponding to each of the power characteristic estimates.

5. A method according to claim 1, wherein the power characteristic that is estimated is a signal-to-interference-plus-noise ratio (SINR).

6. A method according to claim 1, wherein each of said physical channels is a code-multiplexed subchannel.

7. A method according to claim 1 further comprising establishing initial settings at the mobile station using open loop power control commands.

8. A method according to claim 7 further comprising determining power ratios which define desired transmit power ratios between various physical channels, and sending the power ratios to the mobile station.

9. A method according to claim 5 wherein the estimating a power characteristic comprises:
   determining an interference-noise power, $\sigma_n^2$, that depends on the determined noise power and interference power;
   determining a signal energy, $E_b$, that depends on an overall signal power minus the interference-noise power; and
   estimating the SINR by dividing the signal energy, $E_b$, by the interference-noise power.

10. A method of controlling the transit power of a mobile station that is operable to transmit a plurality of physical channels to a basestation simultaneously, the method comprising the steps of for a current power control period:
    receiving power information from the basestation, the power information being based on a power characteristic of at least two of the plurality of physical channels estimated at the base station with the power characteristic being a function of a signal power, a noise power and an interference power, the noise power and interference power being determined from a plurality of power samples from previous power control periods; and
    independently setting transmit powers corresponding to said physical channels in response to said power information with an objective that at least a respective minimum quality of service of each physical channel is maintained.

11. A method according to claim 10, wherein the power information is at least two power control bits and the independently setting transmit powers is in response to the power control bits.

12. A method according to claim 10, wherein the receiving power information from the basestation comprises receiving power control bits that correspond to each of said physical channels and the independently setting transmit powers comprises adjusting the transit powers corresponding to each of said physical channels in response to the received power control bits.

13. A method according to claim 10, wherein each of said physical channels is a code-multiplexed subchannel.

14. A method according to claim 10, wherein the plurality of physical channels comprise a plurality of periods of physical channels, each period comprising one or more physical channels of the same data rate.

15. A method according to claim 14, wherein the power information comprises a plurality of power control bits, each power control bit corresponding to a respective one of the periods of physical channels.

16. A method according to claim 10 wherein the power characteristic is a signal-to-interference-plus-noise ratio (SINR).

17. A method according to claim 16 wherein the SINR is determined according to $$\frac{E_b}{\sigma_n^2}$$

wherein $E_b$ is the desired signal energy and $\sigma_n^2$ is an average interference-noise power.

18. A method of controlling a transmit power of a mobile station with a base station operable to receive simultaneously a plurality of physical channels with a data signal from a mobile station, the method comprising for a current power control period:
    receiving the data signal from the mobile station and separating the respective physical channels within the data signal;
    for each physical channel generating a power characteristic estimate for the physical channel, the power characteristic estimate being a function of a signal power, a noise power and an interference power with the noise power and interference power being determined from a plurality of power samples from previous power control periods;
    generating at least one power control bit on the basis of the power characteristic estimates and with an objective that at least a respective minimum quality of service of each physical channel is maintained; and
    controlling the transmit power at the mobile station of each physical channel by transmitting the at least one power control bit to the mobile station.

19. A method according to claim 18, wherein the power characteristic that is estimated is a signal-to-interference-plus-noise ratio (SINR).

20. A method according to claim 18, wherein each of said physical channels is a code-multiplexed subchannel.

21. A method according to claim 18, wherein transmitting the at least one power control bit comprises:

replacing normal data bits with the at least one power control bit at predetermined locations within a frame.

22. A method according to claim 18, wherein generating the at least one power control bit comprises:

for each physical channel comparing the power characteristic estimate to a respective power threshold level, generating a comparison.

23. A method according to claim 22, wherein the at least one power control bit is a single power bit; and wherein generating the single power control comprises combining all of the comparisons and generating a single power control bit.

24. A method according to claim 23 further comprising:

generating power ratios that indicate relative power levels for the physical channels using the physical channel power threshold levels; and transmitting these power ratios to the mobile station.

25. A method according to claim 18, wherein generating the at least one power control bit comprises:

for each physical channel comparing the power characteristic estimate to respective dynamically adjustable power threshold level and generating a respective power control bit.

26. A method according to claim 25, wherein the at least one power control bit is a plurality of power control bits; and wherein the comparison for each physical channel is a respective one of the power control bits.

27. A method according to claim 25, further comprising dynamically updating the threshold levels.

28. A method according to claim 25 farther comprising:

for each physical channel demodulating the physical channel to produce a respective demodulated physical channel for each demodulated physical channel, determining a frame quality corresponding to the demodulated physical channel; and generating and updating a respective power threshold level determined with use of the frame quality.

29. A method according to claim 18, wherein generating the at least one power control bit comprises:

generating a combined power characteristic estimate using the power characteristic estimates; and comparing the combined power characteristic estimate to a power threshold level to generate a single power control bit.

30. A method according to claim 29 further comprising:

separating a pilot channel from the data signal;

estimating the power characteristic of the separated pilot channel; and generating the combined power characteristic estimate with use of the power characteristic estimate corresponding to the pilot channel.

31. A method according to claim 29 further comprising:

for each physical channel demodulating the physical channel to produce a demodulated physical channel;

for each demodulated physical channel determining a frame quality corresponding to the demodulated physical channel;

for each frame quality generating a physical channel power threshold level using the frame quality; and generating a combined power threshold level that corresponds to the power threshold level using the physical channel power threshold levels.

32. A method according to claim 29 further comprising:

for each physical channel comprising the power characteristic estimate with one of a plurality of physical channel power threshold levels generating a comparison; and transmitting the comparison as a physical channel power control bit to the mobile station.

33. A method according to claim 32 further comprising:

for each physical channel demodulating the physical channel to produce a demodulated physical channel;

determining a frame quality corresponding to the demodulated physical channel;

generating a physical channel power threshold level using the frame quality; and generating a combined power threshold level that corresponds to the power threshold level using the physical channel power threshold levels.

34. A method according to claim 33 further comprising:

generating power ratios that indicate relative power levels for the physical channels using the physical channel power threshold levels; and transmitting these power ratios to the mobile station.

35. A method according to claim 19 wherein the SINR is determined according to $$\frac{E_b}{\sigma_n^2}$$

wherein $E_b$ is the desired signal energy and $\sigma_n^2$ is an average interference-noise power.

* * * * *